United States Patent [19]

Kabata et al.

[11] Patent Number: 4,972,876
[45] Date of Patent: Nov. 27, 1990

[54] LIQUID DIRECTIONAL CONTROL VALVE

[75] Inventors: Masateru Kabata, Osaka; Ikuo Igami, Tokyo, both of Japan

[73] Assignee: Mitsubishi Rayon Co., Ltd., Tokyo, Japan

[21] Appl. No.: 495,381

[22] Filed: Mar. 16, 1990

[30] Foreign Application Priority Data

Mar. 17, 1989 [JP] Japan .................. 1-30306[U]

[51] Int. Cl.$^5$ ................................................ F16K 5/04
[52] U.S. Cl. ........................ 137/625.16; 137/625.47; 251/314
[58] Field of Search .......... 137/625.16, 625.47, 137/862, 887; 251/314

[56] References Cited

U.S. PATENT DOCUMENTS

| | | | |
|---|---|---|---|
| 2,439,515 | 4/1948 | Hodgson | 137/625.47 X |
| 3,133,701 | 5/1964 | McClenahan | 137/625.16 X |
| 3,134,403 | 5/1964 | Rudelick | 137/625.16 |
| 3,531,084 | 9/1970 | Hendrix | 251/314 |
| 3,630,231 | 12/1971 | Miller | 137/625.16 |
| 3,750,704 | 8/1973 | Burke et al. | 137/625.47 |
| 3,788,355 | 1/1974 | Wood | 137/625.16 X |
| 4,285,365 | 8/1981 | Coats et al. | 137/625.16 X |

Primary Examiner—John Rivell
Attorney, Agent, or Firm—Spensley Horn Jubas & Lubitz

[57] ABSTRACT

In a liquid directional control valve, a hollow rotary valve element is accommodated in a valve chamber for angular movement about a rotary axis of the rotary valve element. The rotary valve element has first, second and third openings. A liquid passageway formed by the rotary valve element is simple in construction. First seal elements are arranged about first, second and third outlet ports formed in the valve chamber and in close contact with an outer circumferential surface of the rotary valve element. A pair of circumferential grooves are provided respectively in outer circumferential surface sections of respective both ends of the rotary valve element. Each of the pair of grooves has a sloped bottom. A pair of second annular seal element are arranged respectively in the pair of circumferential grooves in concentric relation thereto.

5 Claims, 3 Drawing Sheets

FIG. 3
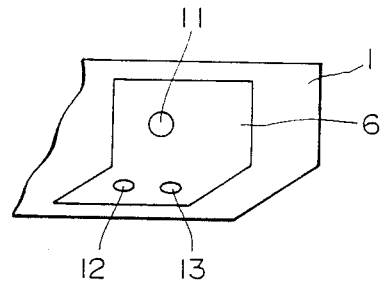
FIG. 4 (a)    FIG. 4 (b)
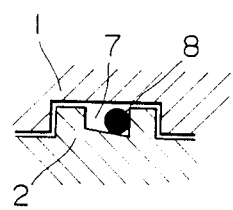    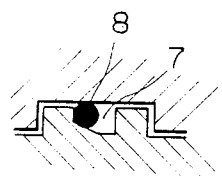

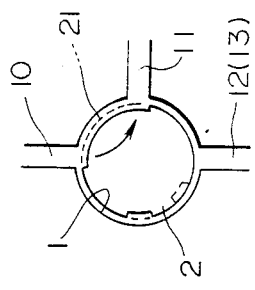
FIG.5(e)
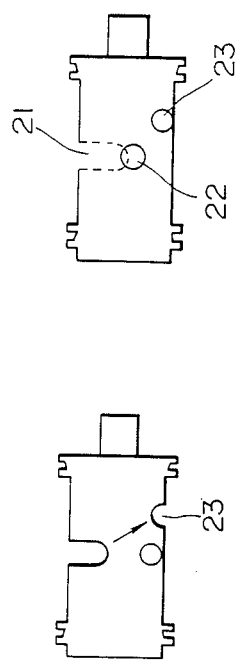
FIG.5(f)
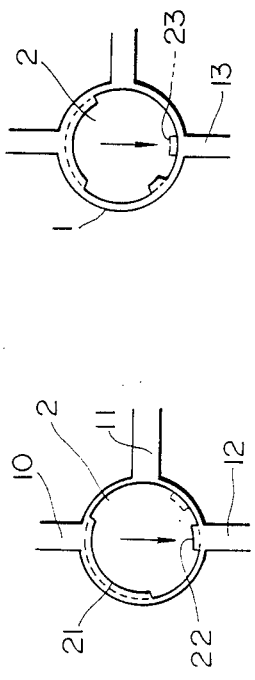
FIG.5(c)
FIG.5(a)
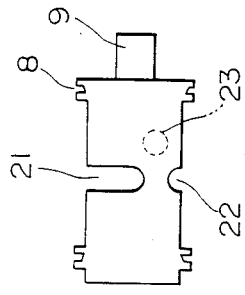
FIG.5(d)
FIG.5(b)

LIQUID DIRECTIONAL CONTROL VALVE

BACKGROUND OF THE INVENTION

The present invention relates to a liquid directional control valve for use with, for example, a liquid purifier, each of various liquid instruments and so on.

As a liquid directional control valve of the kind referred to above, there have been proposed various liquid directional control valves each of which uses a ball valve element or a rotary valve element. However, such liquid directional control valves have such problems that sealing around the valve element is not necessarily sufficient, a water hammer tends to occur, a liquid passageway is complicated in construction or structure so that pressure loss is large, and the like.

SUMMARY OF THE INVENTION

It is therefore an object of the invention to provide a liquid directional control valve in which a liquid passageway is simple in structure and which is superior in sealing function.

It is another object of the invention to provide a liquid directional control valve in which a water hammer is difficult to occur.

According to the invention, there is provided a liquid directional control valve comprising:

a valve chamber having an axis thereof and having a first position, a second position on the opposite side of the valve chamber from the first position, an intermediate position between the first and second positions and a third position located at the second position but spaced a predetermined distance therefrom along the axis of the valve chamber, the valve chamber having an inlet port at the first position, a first outlet port at the intermediate position, a second outlet port at the second position and a third outlet port at the third position, the inlet port, the first outlet port and the second outlet port being arranged in a common first plane perpendicular to the axis of the valve chamber, the third outlet port being arranged in a second plane spaced the predetermined distance from the common first plane along the axis of the valve chamber in parallel relation to the common first plane;

a hollow rotary valve element having a rotary axis extending perpendicularly to the common first plane, the rotary valve element being accommodated in the valve chamber such that the rotary axis of the rotary valve element is in conformity with the axis of the valve chamber, for angular movement about the rotary axis of the rotary valve element, the rotary valve element having first, second and third openings formed in the rotary valve element;

a selecting lever arranged on the outside of the valve chamber and connected to one end of the rotary valve element for selecting communication between the inlet port and first, second and third outlet ports and the first, second and third openings;

a faucet mounting section arranged at a location adjacent the first position and connected to the inlet port;

a discharge section arranged at a location adjacent the second position and having a central discharge port and a shower discharge port formed in the discharge section, the central discharge port communicating with the second outlet port, while the shower discharge port communicates with the third outlet port;

first seal means arranged about the first, second and third outlet ports and in close contact with an outer circumferential surface of the rotary valve element;

wherein the first opening is provided in the rotary valve element in the common first plane circumferentially of the rotary valve element in an angular extent of approximately 90° through 180°, the first opening always communicating with the inlet port and being capable of communicating simultaneously with the first outlet port;

wherein the second opening is provided in the rotary valve element in the common first plane and is capable of communicating only with the second outlet port;

wherein the third opening is provided in the rotary valve element in the second plane at a location spaced circumferentially of the rotary valve element by a predetermined angle from the second opening, the third opening being capable of communicating only with the third outlet port;

a pair of circumferential groove means provided respectively in outer circumferential surface sections of the respective one and the other ends of the rotary valve element, each of the pair of groove means having a bottom which is sloped such that one of opposite sides of the groove means adjacent a corresponding one of the one and the other ends of the rotary valve element, is shallower in depth than the other side; and a pair of second annular seal means arranged respectively in the pair of circumferential groove means in concentric relation thereto.

With the arrangement of the invention, since a liquid passageway formed by the rotary valve element is simple in construction or structure, pressure loss at running or passage of the liquid is extremely low. Further, the first seal means is arranged about the first, second and third outlet ports of the valve chamber, and the pair of sloped circumferential groove means for the respective second annular seal means are provided respectively in the outer circumferential surface sections of the one and the other ends of the rotary valve element. Thus, the liquid directional control valve is high in reliability of sealing.

Preferably, at least one of the first, second and third outlet ports of the valve chamber and at least one of the first, second and third openings formed in the rotary valve element cooperate with each other, in an intermediate stage at control of running of the liquid, to define a liquid passageway whose cross-sectional minimum area is approximately 10% through 50% of an area of a fluid passageway formed by the at least one outlet port and the at least one opening at full running of the liquid.

With the above arrangement of the invention, the liquid passageway whose cross-sectional area has a predetermined ratio is always secured at control of running of the liquid. Thus, the liquid directional control valve is difficult to receive a water hammer so that it is possible to use the liquid directional control valve for a long period of time.

BRIEF DESCRIPTION OF THE DRAWINGS

FIG. 3 is a fragmentary schematic view showing an interior of a valve chamber of the liquid directional control valve illustrated in FIGS. 1 and 2;

FIGS. 4(a) and 4(b) are fragmentary enlarged views showing one of a pair of circumferential grooves formed in a corresponding one of outer circumferential surface sections of respective both ends of a hollow rotary valve element; and FIGS. 5(a) through 5(f) are schematic views showing respective liquid running conditions due to switching or selecting of the liquid running.

DESCRIPTION OF THE EMBODIMENTS

Figure 1:
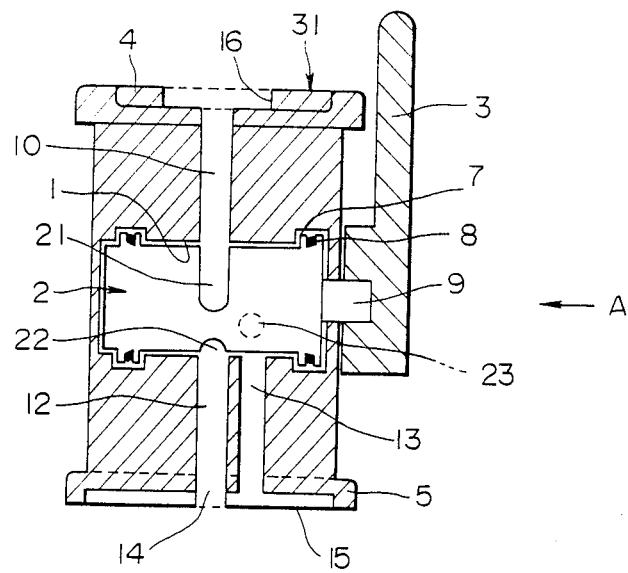
FIG. 1 is a schematic cross-sectional front elevational view of a liquid directional control valve according to an embodiment of the invention.
Figure 2:
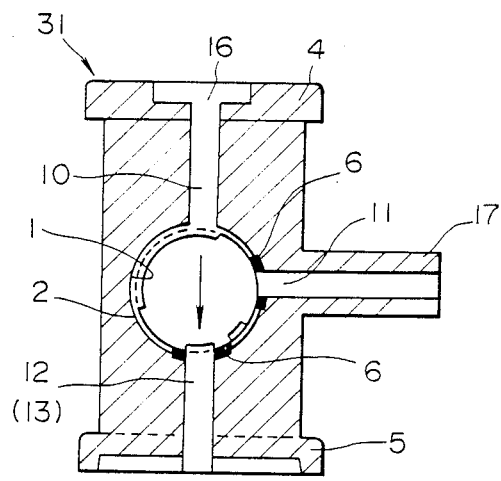
FIG. 2 is a schematic cross-sectional side elevational view of the liquid directional control valve illustrated in FIG. 1, as viewed from the arrow A therein.

Referring to FIGS. 1 and 2, there is shown a liquid directional control valve according to an embodiment of the invention. The liquid directional control valve comprises a body 31 having a center at which a valve chamber 1 is defined. The valve chamber 1 has an axis thereof and has a first or upper position, a second or lower position on the opposite side of the valve chamber 1 from the first position, an intermediate position between the first and second positions and a third position located at the second position but spaced a predetermined distance therefrom along the axis of the valve chamber 1.

The valve chamber 1 has an inlet port 10 at the first position, a first outlet port 11 (refer to FIG. 2) at the intermediate position, a second outlet port 12 at the second position and a third outlet port 13 at the third position. The first outlet port 11 is connected to a liquid or water purifier or the like through a connecting section 17. The inlet port 10, first outlet port 11 and second outlet port 12 are arranged in a vertical or common first plane perpendicular to the axis of the valve chamber 1. In this connection, refer also to FIG. 3. The third outlet port 13 is arranged in a second plane spaced the predetermined distance from the common first plane along the axis of the valve chamber 1 in parallel relation to the common first plane. Each of the first, second and third outlet ports 11, 12 and 13 has a circular or elliptic configuration in plan. Normally, the first, second and third outlet ports 11, 12 and 13 have their opening areas which are substantially the same as each other.

Referring back to FIGS. 1 and 2, a rotary valve element 2 has a rotary axis extending perpendicularly to the common first plane. The rotary valve element 2 is accommodated in the valve chamber 1 such that the rotary axis of the rotary valve element 2 is in conformity with the axis of the valve chamber 1, for angular movement about the rotary axis of the rotary valve element 2. That is, the rotary valve element 2 is accommodated in the valve chamber 1 under an inscribed condition. The rotary valve element 2 has first, second and third openings, 21, 22 and 23 which are formed in an outer circumferential portion of the rotary valve element 2 subsequently to be described. As illustrated in FIGS. 1 and 2, the rotary valve element 2 is hollow. A selecting lever 3 is arranged on the outside of the valve chamber 1 and is connected to one end of the rotary valve element 2 through a joint 9 for selecting communication between the inlet port 10 and first, second and third ports 11, 12 and 13 and the first, second and third openings 21, 22 and 23 subsequently to be described.

The body 31 has a faucet mounting section 4 which is arranged at a location adjacent the first position. A passage 16, into which a faucet is inserted, is formed in the faucet mounting section 4 and is connected to the inlet port 10.

The body 31 also has a discharge section 5 which arranged at a location adjacent the second position and which has a central discharge port 14 and a shower discharge port 15 formed in the discharge section 5. The central discharge port 14 communicates with the second outlet port 12, while the shower discharge port 15 communicates with the third outlet port 13.

Three first seal elements 6 (only two shown in FIG. 2) are arranged respectively about the first, second and third outlet ports 11, 12 and 13 and are in close contact with the outer circumferential surface of the rotary valve element 2. By these first seal elements 6, sealing is conducted between the outer circumferential surface of the rotary valve element 2 and the circumferential surface of the valve chamber 1. In this connection, since the first, second and third outlet ports 11, 12 and 13 are sealed respectively by the first seal elements 6, the liquid directional control valve is superior in accuracy of sealing, as compared with a construction in which only the inlet port 10 is sealed by a seal element.

The above-described first opening 21 is provided in the rotary valve element 2 in the common first plane circumferentially of the rotary valve element in an angular extent of approximately 90° through 180°, preferably, approximately 100° through 160°. The first opening 21 always communicates with the inlet port 10. Further, the first opening 21 is capable of communicating simultaneously with the first outlet port 11 by angular movement of the rotary valve element 2 about the rotary axis thereof, and can takes a communicating condition illustrated in FIG. 5(e).

The second opening 22 is provided in the rotary valve element 2 in the common first plane and is capable of communicating only with the second outlet port 12 by the angular movement of the rotary valve element 2 about the rotary axis thereof.

The third opening 23 is provided in the rotary valve element 2 in the second plane at a location spaced circumferentially of the rotary valve element 2 by a predetermined angle from the second opening 22. The third opening 23 is capable of communicating only with the third outlet port 13 by the angular movement of the rotary valve element 2 about the rotary axis thereof.

FIGS. 5(a), 5(c) and 5(e) are schematic side elevational views showing a relationship between the valve chamber 1 and the rotary valve element 2 under each of three liquid passage conditions which are formed due to selection or control of liquid running or passage. FIGS. 5(b), 5(d) and 5(f) are schematic front elevational views showing arrangement conditions of the rotary valve element 2, which correspond respectively to FIGS. 5(a), 5(c) and 5(e). FIG. 5(a) and 5(b) show a condition under which the inlet port 10 communicates with the second outlet port 12. FIG. 5(c) and 5(d) show a condition under which the inlet port 10 communicates with the third outlet port 13. FIG. 5(e) and 5(f) show a condition under which the inlet port 10 communicates with the first outlet port 11. Liquid or water flows along directions indicated respectively by the arrows in FIGS. 5(a), 5(c) and 5(e). In this connection, parts of seal elements and O-ring seal elements are omitted in illustration from FIGS. 5(a) through 5(f).

Further, in FIGS. 5(a) through 5(f), angular movement of the selecting lever 3 about the rotary axis of the rotary valve element 2 twice 45° by 45°, that is, by 90° in total causes the liquid running conditions to be altered in order of FIGS. 5(a), 5(c) and 5(e). In this connection, it is possible to suitably set the total selecting angles to a value within a range substantially equal to or less than 160°.

Furthermore, in the liquid directional control valve according to the embodiment of the invention, the arrangement angles of the respective first, second and third openings 21, 22 and 23 formed in the rotary valve element 2 are set such that, at selection or control of liquid running among the liquid running conditions shown respectively in FIGS. 5(a), 5(c) and 5(e), the second outlet port 12 and the third outlet port 13 communicate simultaneously with the inlet port 10, and the third outlet port 13 and the first outlet port 11 communicate simultaneously with the inlet port 10. By doing so, it is possible to suppress or restrain a water hammer phenomenon at control of the liquid running. In order to exhibit such effect, it is preferable that at least one of the first, second and third outlet ports 11, 12 and 13 of the valve chamber 1 and at least one of the first, second and third openings 21, 22 and 23 formed in the rotary valve element 2 cooperate with each other, in an intermediate stage at control of the liquid running, to define a liquid passageway whose cross-sectional minimum area is above approximately 10% of an area of a fluid passageway formed by the at least one outlet port and the at least one opening at full running of the liquid. It is sufficient that the liquid passageway defined in the intermediate stage at control of the liquid running has the cross-sectional minimum area which is of the order of approximately 50% of the area of the fluid passageway formed by the at least one outlet port and the at least one opening at the full passage of the liquid.

As shown in FIGS. 4(a) and 4(b), a pair of circumferential grooves 7 (only one shown) is provided respectively in outer circumferential surface sections of respective both ends of the rotary valve element 2. Each of the pair of grooves 7 has a bottom which is sloped such that one of opposite sides of the groove 7 adjacent a corresponding one of the both ends of the rotary valve element 2, is shallower in depth than the other side. A pair of second annular seal elements or 0-ring seal elements 8 (only one shown) are arranged respectively in the pair of circumferential grooves 8 in concentric relation thereto. With such groove construction, when the liquid pressure is applied to the 0-ring seal element 8, the latter moves toward the shallow side of the groove 7 so that the interface between the outer circumferential surface of the rotary valve element 2 and the circumferential surface of the valve chamber 1 can be sealed under a compressed condition of the O-ring seal element 8. Thus, it is possible to well maintain the sealing condition.

What is claimed is:

1. A liquid directional control valve comprising:
   a valve chamber having an axis thereof and having a first position, a second position on the opposite side of said valve chamber from said first position, an intermediate position between said first and second positions and a third position located at said second position but spaced a predetermined distance therefrom along the axis of said valve chamber, said valve chamber having an inlet port at said first position, a first outlet port at said intermediate position, a second outlet port at said second position and a third outlet port at said third position, said inlet port, first outlet port and second outlet port being arranged in a common first plane perpendicular to the axis of said valve chamber, said third outlet port being arranged in a second plane spaced said predetermined distance from said common first plane along the axis of said valve chamber in parallel relation to said common first plane;
   a hollow rotary valve element having a rotary axis extending perpendicularly to said common first plane, said rotary valve element being accommodated in said valve chamber such that the rotary axis of said rotary valve element is in conformity with the axis of said valve chamber, for angular movement about the rotary axis of said rotary valve element, said rotary valve element having first, second and third openings formed in said rotary valve element;
   a selecting lever arranged on the outside of said valve chamber and connected to one end of said rotary valve element for selecting communication between said inlet port and first, second and third outlet ports and said first, second and third openings;
   a faucet mounting section arranged at a location adjacent said first position and connected to said inlet port;
   a discharge section arranged at a location adjacent said second position and having a central discharge port and a shower discharge port formed in said discharge section, said central discharge port communicating with said second outlet port, while said shower discharge port communicates with said third outlet port;
   first seal means arranged about said first, second and third outlet ports and in close contact with an outer circumferential surface of said rotary valve element;
   wherein said first opening is provided in said rotary valve element in said common first plane circumferentially of said rotary valve element in an angular extent of approximately 90° through 180°, said first opening always communicating with said inlet port and being capable of communicating simultaneously with said first outlet port;
   wherein said second opening is provided in said rotary valve element in said common first plane and is capable of communicating only with said second outlet port;
   wherein said third opening is provided in said rotary valve element in said second plane at a location spaced circumferentially of said rotary valve element by a predetermined angle from said second opening, said third opening being capable of communicating only with said third outlet port;
   a pair of circumferential groove means provided respectively in outer circumferential surface sections of the respective one and the other ends of said rotary valve element, each of said pair of groove means having a bottom which is sloped such that one of opposite sides of the groove means adjacent a corresponding one of the one and the other ends of said rotary valve element, is shallower in depth than the other side; and a pair of second annular seal means arranged respectively in said pair of circumferential groove means in concentric relation thereto.

2. The liquid directional control valve according to claim 1, wherein at least one of said first, second and third outlet ports of said valve chamber and at least one of said first, second and third openings formed in said rotary valve element cooperate with each other, in an intermediate stage at control of running of the liquid, to define a liquid passageway whose cross-sectional minimum area is approximately 10% through 50% of an area of a fluid passageway formed by said at least one outlet port and said at least one opening at full running of the liquid.

3. The liquid directional control valve according to claim 1, wherein said first seal means comprises three seal elements provided respectively about said first, second and third outlet ports.

4. The liquid directional control valve according to claim 1, wherein each of said pair of second annular seal means is constituted by an O-ring seal element.

5. The liquid directional control valve according to claim 1, wherein said first opening in said rotary valve element extends circumferentially thereof in the annular extent of approximately 100° through 160°.

* * * * *